(12) United States Patent
Li

(10) Patent No.: US 11,156,444 B2
(45) Date of Patent: Oct. 26, 2021

(54) DISTANCE MEASURING DEVICE

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Yueming Li, Hangzhou (CN)

(73) Assignees: HANGZHOU GREAT STAR INDUSTRIAL CO., LTD., Hangzhou (CN); HANGZHOU GREAT STAR TOOLS CO., LTD., Hangzhou (CN)

( * ) Notice: Subject to any disclaimer, the term of this patent is extended or adjusted under 35 U.S.C. 154(b) by 411 days.

(21) Appl. No.: 16/334,648

(22) PCT Filed: Oct. 25, 2016

(86) PCT No.: PCT/CN2016/103242
§ 371 (c)(1),
(2) Date: Mar. 19, 2019

(87) PCT Pub. No.: WO2018/076178
PCT Pub. Date: May 3, 2018

(65) Prior Publication Data
US 2021/0278189 A1    Sep. 9, 2021

(51) Int. Cl.
*G01B 3/1041* (2020.01)
*G01B 3/1092* (2020.01)
(Continued)

(52) U.S. Cl.
CPC ......... *G01B 3/1041* (2013.01); *G01B 3/1092* (2020.01); *G01B 11/026* (2013.01); *G01S 17/08* (2013.01)

(58) Field of Classification Search
CPC .. G01B 3/1041; G01B 3/1092; G01B 11/026; G01S 17/08
(Continued)

(56) References Cited

U.S. PATENT DOCUMENTS 5,182,863 A * 2/1993 Rando ..................... G01B 3/00
33/227
5,760,392 A * 6/1998 Hisamoto ............ G01B 5/0014
250/237 G (Continued)

FOREIGN PATENT DOCUMENTS

CN         2350725 Y    11/1999
CN      101713826 A     5/2010
(Continued)

OTHER PUBLICATIONS

App. No. PCT/CN2016/103242; International Search Report and Written Opinion dated Jul. 26, 2017.
(Continued)

*Primary Examiner* — Yaritza Guadalupe-McCall
(74) *Attorney, Agent, or Firm* — Fitch, Even, Tabin & Flannery LLP

(57) ABSTRACT

The present invention relates to a distance measuring device, which includes a shell and a laser ranging device provided at the inside and/or the outer surface of the shell. The advantages of the invention lie in that a distance measuring device is provided, which combines the tapeline with the laser ranging device, possessing both short distance measuring and long distance measuring functions, and has such features as simple operation, convenience for carrying, lower cost, high measuring accuracy, etc., being suitable to be widely used in applications such as in the fields of construction work, interior decoration, measurement in danger zone, etc.

20 Claims, 10 Drawing Sheets

(51) Int. Cl.
  *G01B 11/02* (2006.01)
  *G01S 17/08* (2006.01)
(58) Field of Classification Search
  USPC .......................................... 33/769, DIG. 21
  See application file for complete search history.

(56) References Cited

U.S. PATENT DOCUMENTS

| | | | | |
|---|---|---|---|---|
| 5,777,899 | A * | 7/1998 | Kumagai | G01C 15/00 |
| | | | | 33/291 |
| 6,093,928 | A * | 7/2000 | Ohtomo | G01D 5/34 |
| | | | | 250/231.13 |
| 6,209,219 | B1 * | 4/2001 | Wakefield | G01B 3/00 |
| | | | | 33/761 |
| 7,036,241 | B2 * | 5/2006 | Williams | G01B 3/12 |
| | | | | 33/772 |
| 7,119,533 | B2 * | 10/2006 | Tamura | G01C 17/38 |
| | | | | 324/202 |
| 7,454,840 | B2 * | 11/2008 | Delfini | G01C 15/002 |
| | | | | 33/286 |
| 7,690,124 | B1 * | 4/2010 | Henry | G01C 15/004 |
| | | | | 33/286 |
| 2004/0040170 | A1 * | 3/2004 | Sanoner | G01B 3/11 |
| | | | | 33/762 |
| 2004/0223164 | A1 | 11/2004 | Gogolla | |
| 2005/0111301 | A1 | 5/2005 | Rickman | |
| 2006/0010706 | A1 * | 1/2006 | Williams | G01B 3/12 |
| | | | | 33/772 |
| 2006/0021244 | A1 * | 2/2006 | Oura | G01B 3/1061 |
| | | | | 33/763 |
| 2007/0101593 | A1 * | 5/2007 | Jang | G01S 7/521 |
| | | | | 33/286 |
| 2009/0273771 | A1 | 11/2009 | Gittinger et al. | |
| 2010/0088914 | A1 * | 4/2010 | Cerwin | E01B 35/02 |
| | | | | 33/645 |
| 2010/0103406 | A1 | 4/2010 | Zimmermann | |
| 2014/0090264 | A1 | 4/2014 | Li | |

FOREIGN PATENT DOCUMENTS

| | | |
|---|---|---|
| CN | 203012137 U | 6/2013 |
| CN | 105627857 A | 6/2016 |
| CN | 205484804 U | 8/2016 |
| CN | 206274346 U | 6/2017 |
| CN | 105627857 B | 8/2018 |
| DE | 202014005479 U1 | 9/2014 |
| DE | 102015101446 A1 | 8/2016 |
| JP | H08327737 A | 12/1996 |
| JP | 2004233106 A | 8/2004 |
| JP | 3185168 U | 8/2013 |
| TW | M447982 U1 | 3/2013 |

OTHER PUBLICATIONS

JPO; App. No. 2019-522486; Decision of Refusal dated Feb. 24, 2021.

* cited by examiner

DISTANCE MEASURING DEVICE

CROSS-REFERENCE TO RELATED APPLICATIONS

This application is a U.S. national phase application of International Application No. PCT/CN2016/103242, filed Oct. 25, 2016, designating the United States.

FIELD OF THE INVENTION

The present invention relates to the field of distance measuring tools and in particular to a distance measuring device.

DESCRIPTION OF THE PRIOR ART

Tapelines and laser ranging devices are common distance measuring tools, which can be applied to industries of construction, interior decoration, traffic accident processing, etc. In the prior art, when a tapeline is in use, the tap end part and the measuring terminal end of the tap need to be respectively leveled with the starting end and the terminal end of the object to be measured, so the measurer needs to use his/her hands or other auxiliary equipments to keep the tape to be fitted onto the object to be measured. Under certain circumstances, a regular tapeline is not convenient to operate and has lower measurement accuracy. For example, in the field of measurement in danger zone, the applicability of a regular tapeline is poor.

Again, in the construction industry for example, tapelines are often used to measure the length of a transverse object hung up from the ground or the distance from the object to a vertical object of reference. Since there is no attaching point for the tapeline, the measurement can only rely on ocular estimation of the start point or the terminal point to be measured from a distance. Therefore, the error of the measured value is large and the measurement accuracy is poor, which will adversely affect the following construction work. If more accurate data of measurement at a height are desired to be acquired by using a tapeline, the measurer needs to establish a supporting frame or use a long ladder to climb high up, to attach the tapeline onto the object to be measured to complete the measurement. If the object to be measured has a great length, two or more workers are then needed to climb high up to complete the measurement, which is troublesome and expensive in labor cost while it is dangerous due to the risk of falling of the measurer from high up.

Moreover, due to the limit of the length of the tapeline, the applications are limited thereby, and the measurement range is relatively limited which can only be used in scenes of smaller space rather than scenes of larger space. The measurement range of a regular tapeline is generally around 5 meters, 7.5 meters or 10 meters. Some specially made tapelines may even have a measurement range up to 15 meters or 20 meters. However, the larger the measurement range of the tapeline is, the larger the volume thereof is and thus the tapeline is inconvenient for carrying and use by the measurer.

Although laser ranging devices in the prior art have higher measurement accuracy, they have larger volumes and higher cost, and are inconvenient for carrying and use. Some of the portable laser ranging devices have smaller volumes and are easy for carrying, but after being used over a long time, the light emitting surface of the laser source and the light receiving surface of the light sensor device will experience relatively large abrasions, such that the light feedback sensitivity and distance measurement accuracy are affected. Moreover, the laser ranging devices have larger errors when detecting short distances, and are quite limited in the field of interior decoration and are difficult to achieve large-scale applications.

SUMMARY OF THE INVENTION

It is an object of the present invention to provide a distance measuring device which solves the technical problems residing in the prior art, such as inconvenience of operation, low measurement accuracy, inconvenience for carrying, etc.

In order to solve the above technical problems, the present invention provides a distance measuring device, including a shell, and a laser ranging device provided at the inside and/or the outer surface of the shell. The laser ranging device comprises a laser generating means, a photoelectric conversion means, a circuit board and a power supply. The laser generating means is used for emitting measurement beam to the object to be measured; the object to be measured reflects the measurement beam, generating reflected light; the photoelectric conversion means is used for capturing all or part of the reflected light and converting the optical signal of the captured reflected light into at least one feedback electrical signal; the power supply is connected to the laser generating means, the photoelectric conversion means and the circuit board. At least one processor is provided on the circuit board; the processor is connected to the laser generating means for controlling the laser generating means; the processor is connected to the photoelectric conversion means for acquiring the feedback electrical signal and calculating a distance from the object to be measured to the distance measuring device.

Further, the laser generating means comprises a light emitting surface; the photoelectric conversion means comprises a light receiving surface provided beside the light emitting surface; the light emitting surface and the light receiving surface are disposed in a side by side arrangement or in an up and down arrangement on the outer surface of the shell. Or, the laser generating means comprises a light emitting surface; the photoelectric conversion means comprises a light receiving surface provided beside the light emitting surface; the outer surface of the shell is provided with a laser beam emitting port directly facing the light emitting surface and a light receiving hole directly facing the light receiving surface and provided beside the laser beam emitting port; the laser beam emitting port and the light receiving hole are disposed in a side by side arrangement or in an up and down arrangement; the light emitting surface emits the measurement beam through the laser beam emitting port; and the light receiving surface captures the reflected light through the light receiving hole.

Further, the center point of the light receiving surface is located on the same straight line as the center point of the light emitting surface; and the area of the light receiving surface is 3 to 10 times the area of the light emitting surface.

Further, the distance measuring device also includes a tapeline structure disposed within the shell.

Further, the laser generating means and the photoelectric conversion means are both located above or below the tapeline structure; and the power supply is provided on the left or right side of the tapeline structure.

Further, the power supply, the laser generating means and the photoelectric conversion means are all located in front of or behind the tapeline structure; and the laser generating means and the photoelectric conversion means are both located above or below the power supply, or on the left or on the right side of the power supply.

Further, the power supply is located in front of or behind the tapeline structure; and the laser generating means and the photoelectric conversion means are located on the left or on the right side of the tapeline structure.

Further, the circuit board is disposed horizontally above the tapeline structure; or the circuit board is vertically disposed on the left or right side of the tapeline structure.

Further, the tapeline structure comprises a tapeline wheel, a tape, a tape outlet, a pressure piece and a locking key. The tapeline wheel is disposed within the shell; all or part of the tape is wound on the tapeline wheel; one end of the tape is fixedly connected to the tapeline wheel and the other end is provided with a tape end portion; the tape outlet is provided at the lower end of the outer side wall of the shell, and the tape end portion extends out of the shell through the tape outlet; the pressure piece is provided in the shell and adjacent to the tape outlet, for pressing the tape so that the length of the tape outside the shell remains unchanged; and the locking key is provided on an outer surface of the shell, for controlling the pressure piece to press or loosen the tape.

Further, the distance measuring device also includes a second tapeline structure disposed within the second shell; and the second shell is detachably connected to the shell.

Further, the shell is L-shaped; the shell includes a horizontal portion located at an upper portion of the shell and a vertical portion located at a lower portion of the shell; wherein the second shell is detachably connected to the lower left of the shell.

Further, the shell includes at least one first snap slot recessed on a left side face of the vertical portion of the shell; the second shell includes at least one first strip protruding from a right side face of the second shell; when the second shell is connected to the shell, the first strip is snap-fitted to the first snap slot.

Further, the shell includes at least one connecting member, each of which projects downwardly from a bottom surface of the horizontal portion of the shell, the connecting member is adjacent to a left side face of the shell, each connecting member is provided with a nut in the horizontal direction, and the nut faces a left side of the shell; the second shell includes at least one connecting through hole, at least one screw hole and at least one screw, each connecting though hole extends perpendicularly through a top surface of the second shell, the position thereof is corresponding to the position of the connecting member; the screw hole horizontally extends through a left side face of the second shell; when the second shell is connected to the shell, the connecting member passes through the connecting through hole, each nut corresponds to a screw hole, and the corresponding nut and screw hole are located on the same straight line; and each screw passes through a screw hole and is fixed on a nut corresponding to the screw hole.

Further, the second tapeline structure includes a second tapeline wheel, a second tape, a second tape outlet, a second pressure piece and a second locking key. The second tapeline wheel is disposed within the second shell; all or part of the second tape is wound on the second tapeline wheel; one end of the second tape is fixedly connected to the second tapeline wheel, and the other end is provided with a second tape end portion; and the second tape outlet is provided at a lower end of the outer side wall of the second shell, the second tape end portion extends out of the second shell through the second tape outlet. The second pressure piece is provided in the second shell and adjacent to the second tape outlet, for pressing the second tape so that the length of the second tape outside the second shell remains unchanged; and the second locking key is provided on an outer surface of the second shell, for controlling the second pressure piece to press or loosen the second tape.

Further, the second shell includes a rectangular through hole vertically extending through a top surface of the second shell and positioned above the second tapeline wheel. The shell includes an arcuate groove recessed on a bottom surface of the shell and located above the rectangular through hole; when the second shell is connected to the shell, an upper portion of the second tape wound on the second tapeline wheel passes through the rectangular through hole and is disposed within the arcuate groove.

Further, the distance measuring device also includes an outer casing of shell, which is a transverse U-shape; when the second shell is connected to the shell, the outer casing of shell is coated on an outer surface of the shell and the second shell.

Further, the shell includes at least one second snap slot recessed on a front side face and a back side face of the vertical portion of the shell; the outer casing of shell includes at least one second strip protruding from an inner side face of the outer casing of shell and corresponding to the second snap slot; when the outer casing of shell is coated on the outer surface of the shell, the second strip is snap-fitted to the second snap slot.

The outer casing of shell comprises a first outer casing through hole, a second outer casing through hole, a third outer casing through hole, a first outer casing notch and a second outer casing notch. The first outer casing through hole extends through a top surface of the outer casing of shell, corresponding to the display means; the second outer casing through hole extends through a right side face of the outer casing of shell, corresponding to the power supply; the third outer casing through hole extends through a bottom surface of the outer casing of shell, corresponding to the locking key;

the first outer casing notch is provided on a left side face of an upper portion of the outer casing of shell; and the second outer casing notch is provided on a left side face of a lower portion of the outer casing of shell.

Further, the distance measuring device also includes a display means connected to the processor, for displaying the distance from the object to be measured to the distance measuring device. The display means is provided on the outer surface of the shell, preferably, an upper surface, a front surface or a rear surface of the shell.

Further, the distance measuring device also includes an operating means connected to the processor, for transmitting at least one control instruction to the laser ranging device. The operating means comprises an operation panel and an operation circuit board, the operation panel is provided on an upper surface, a front surface or a rear surface of the shell, for inputting at least one control action, and each of the control actions corresponds to a control instruction; and the operation circuit board is disposed below the operation panel and is connected to the processor, for converting the at least one control action into at least one electrical signal and transmitting the electrical signal to the processor; each of the electrical signals corresponds to a control instruction; and the control instructions comprise, but are not limited to, start instructions, close instructions, and store instructions.

Further, the circuit board is provided with a memory connected to the processor, for storing the distance from the object to be measured to the distance measuring device.

Further, the laser generating means comprises, but is not limited to, a laser tube; the photoelectric conversion means comprises, but is not limited to, a photoelectric sensor; the power supply comprises, but is not limited to, a button battery, a rectangular battery or a cylindrical battery.

The advantages of the invention lie in that a distance measuring device is provided, which effectively improves the prior laser ranging device to prolong the service life of the laser ranging device, without decreasing the feedback sensitivity to light and measurement accuracy of laser ranging device even after long time of use. The invention combines the tapeline with the laser ranging device, possessing short distance measuring and long distance measuring functions, and has such features as simple operation, convenience for carrying, lower cost, high measuring accuracy, etc., thus being suitable to be widely used in applications such as in the fields of construction work, interior decoration, measurement in danger zone, etc.

Figure 1:
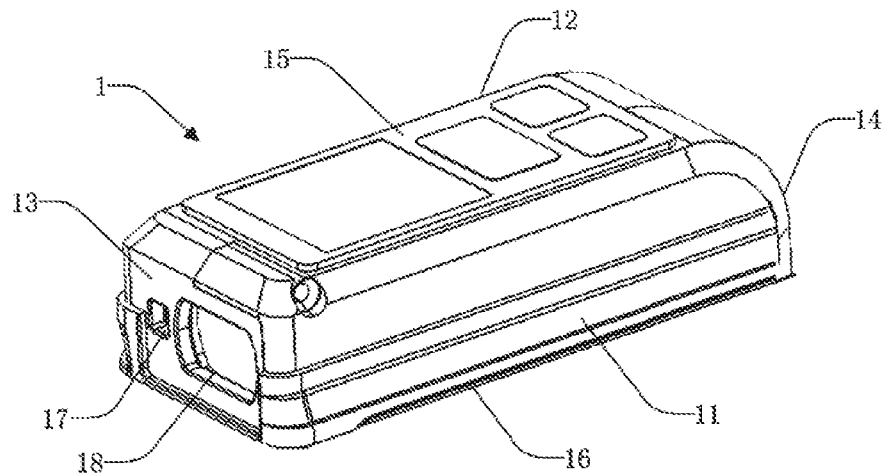
FIG. 1 is an overall structural schematic view of Embodiment 1 of the invention.

Reference numerals in the drawings are listed as follows:

1 shell, 2 laser ranging device, 3 tapeline structure, 4 second shell, 5 second tapeline structure, 6 outer casing of shell, 7 clip;

11 front side face, 12 back side face, 13 left side face, 14 right side face 15 top face, 16 bottom face, 17 laser beam emitting port, 18 light receiving hole;

21 laser generating means, 22 photoelectric conversion means, 23 circuit board, 24 display means, 25 operating means, 26 power supply;

31 tapeline wheel, 32 tape, 33 tape outlet, 34 pressure piece, 35 locking key, 36 tape end portion;

51 second tapeline wheel, 52 second tape, 53 second tape outlet, 54 second pressure piece, 55 second locking key, 56 second tape end portion;

101 horizontal portion, 102 vertical portion, 103 first snap slot, 104 connecting member, 105 nut, 106 arcuate groove, 107 second snap slot;

211 light emitting surface, 221 light receiving surface, 231 processor, 232 memory;

251 operation panel, 252 operation circuit board, 253 press button;

401 first strip, 402 connecting through hole, 403 screw hole, 404 screw, 405 rectangular through hole;

601 second strip, 602 first outer casing through hole, 603 second outer casing through hole, 604 third outer casing through hole, 605 first outer casing notch, 606 second outer casing notch.

DETAILED DESCRIPTION OF THE PREFERRED EMBODIMENTS

Five preferred embodiments of the present invention will be described more fully hereinafter with reference to the accompanying drawings, in which preferred embodiments of the invention are shown, for the purpose of clarity and better understanding of the techniques. This invention may be embodied in various different forms and the invention should not be construed as being limited to the embodiments set forth herein.

In the description, elements with identical structure are marked with the same reference numerals, and like elements with similar structure or function are marked throughout with like reference numerals, respectively. The dimension and thickness of each element in the accompanying drawings are arbitrarily shown, and the invention does not define the dimension and thickness of each element. Certain parts may be shown somewhat exaggerated in thickness in the interest of clarity.

Directional terms described by the present invention, such as upper, lower, front, back, left, right, inner, outer, side, etc., are only directions by referring to the accompanying drawings, and are thus used to explain and describe the present invention, but the present invention is not limited thereto.

It will be understood that when an element s referred to as being "on/above" another element, it can be directly placed on the other element, or there may be an intermediate element on which it is placed, and the intermediate element is placed on the other element. When an element is referred to as being "mounted to" or "connected to" another element, either one can be understood as being directly "mounted" or "connected", or via an intermediate element to be indirectly "mounted to" or "connected to" the other element.

Embodiment 1

Figure 2:
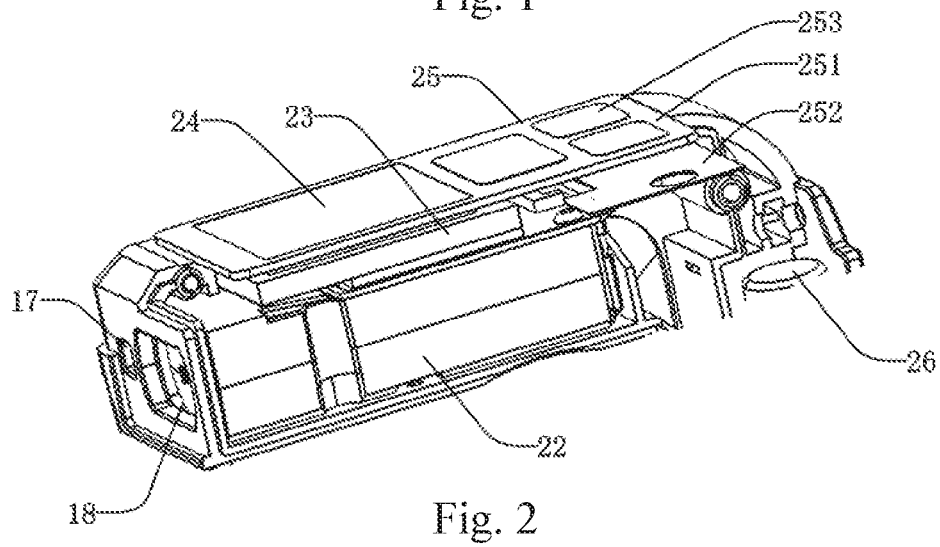
FIG. 2 is a structural schematic view of Embodiment 1 of the invention after the front side face of the shell is opened.
Figure 3:
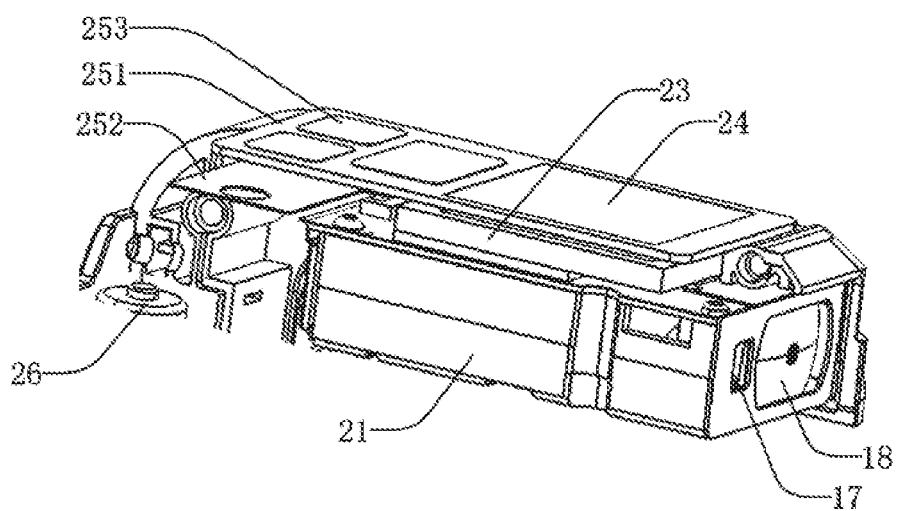
FIG. 3 is a structural schematic view of Embodiment 1 of the invention after the back side face of the shell is opened.

As shown in FIGS. 1-3, Embodiment 1 provides a distance measuring device that can independently implement laser ranging, which includes a shell 1 and a laser ranging device 2. The laser ranging device 2 is provided in the interior of the shell and/or on the outer surface thereof.

As shown in FIG. 1, the shell 1 is an irregular cuboid having the width thereof equal to or approximately equal to the height thereof, and the thickness thereof is about 25% to 40% of the width thereof. The shell 1 has six faces, namely the front side face 11, the rear side face 12, the left side face 13, the right side face 14, the top face 15, and the bottom face 16.

As shown in FIGS. 2 and 3, the laser ranging device 2 includes a laser generating means 21, a photoelectric conversion means 22, a circuit board 23, a display means 24, an operating means 25, and a power supply 26. The laser generating means 21 is preferably a laser tube, that is, a glass sealed-off CO2 laser, but is not limited to a laser tube, and may be other means for generating a laser beam. The photoelectric conversion means 22 is preferably a photoelectric sensor, but is not limited to a photoelectric sensor, or may be other means for capturing light and converting the optical signal into an electrical signal. The laser generating means 21 and the photoelectric conversion means 22 may be arranged in a side by side arrangement or in an up and down arrangement. In the present embodiment, the laser generating means 21 is integrated with the photoelectric conversion means 22.

Figure 4:
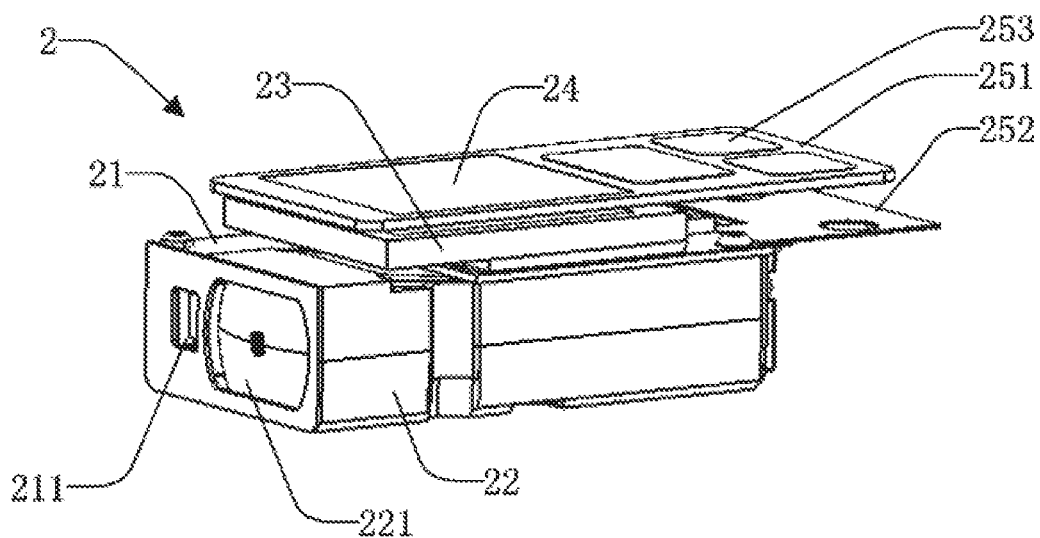
FIG. 4 is a structural schematic view of Embodiment 1 of the invention after the shell is removed.

As shown in FIG. 4, the laser generating means 21 includes a light emitting surface 211, and the photoelectric conversion means 22 includes a light receiving surface 221. The light receiving surface 221 is disposed beside the light emitting surface 211 and is adjacent to the light emitting surface 211. The two may be provided in a side by side arrangement or in an up and down arrangement.

Figure 5:
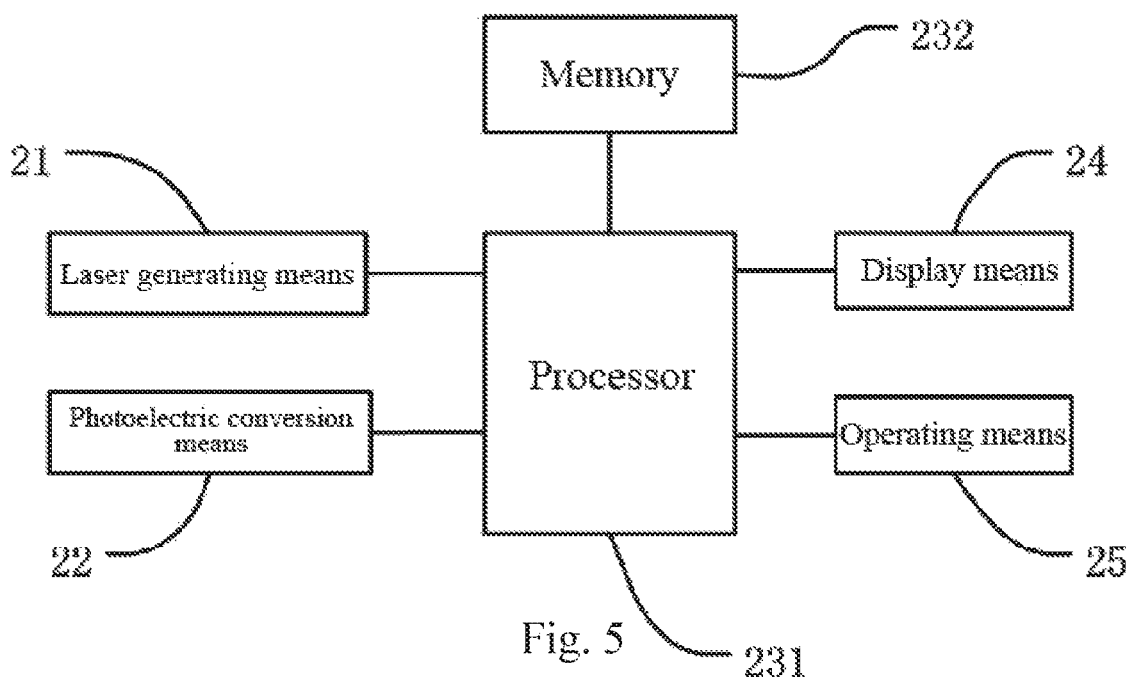
FIG. 5 is a structural block diagram of the circuit in Embodiment 1 of the invention.

As shown in FIG. 5, at least one processor 231 is provided on the circuit board 23. The processor 231 is connected to the laser generating means 21 for controlling the normal operation of the laser generating means 21. The processor 231 is connected to the photoelectric conversion means 22 for acquiring the feedback electric signal and calculating the distance from the object to be measured to the distance measuring device of the present embodiment. Alternatively, a memory 232 may be provided on the circuit board 23, the memory 232 is connected to the processor 231 for storing the distance from the object to be measured to the distance measuring device so that the user can check the reading record again from the display means 24 when the user forgets the reading.

In the present embodiment, the processor 231 issues a control signal instructing the laser generating means 21 to emit a laser beam as a measuring light beam to the object to be measured. The measuring light beam forms a reflection on the surface of the object to be measured, producing reflected light and a portion of the reflected light parallel to the measurement beam can be captured by the photoelectric conversion means 22 and converted into an electrical signal to be fed back to the processor 231. The inside of the processor 231 may be provided with a timer for recording the time point at which the laser beam is emitted from the laser generating means 21 and the time point at which the feedback electric signal is obtained. Based on the time difference between the two time points, it is possible to calculate the distance between the object to be measured and the distance measuring device. During the above mentioned time period the laser beam travels back and forth from the object to be measured to the distance measuring device at the speed of light, and the half of the product of the time difference and the speed of light is the distance to be measured between the object to be measured and the distance measuring device.

In the present embodiment, the light emitting surface of the laser generating means and the light receiving surface of the photoelectric conversion means may be both provided on the outer surface of the shell (such as the left side face 13 of the shell), the laser generating means 21 emits a laser beam as a measuring light beam from the light emitting surface 211, and photoelectric conversion means 22 captures the external reflected light through the light receiving surface 221. Since the laser beam is always perpendicular to the plane where the light emitting surface 211 is located, the light emitting surface 211 can be used to assist the user in aiming at the object to be measured; thus the laser beam can be directly irradiated to the object to be measured. In order to ensure the reflection effect, the laser beam is preferably directly irradiated to the plane on the object to be measured, and making the laser beam be vertically irradiated to the plane as much as possible, so that more light can be reflected back to the distance measuring device, making the measurement results more accurate.

If the light emitting surface and the light receiving surface are provided on the outer surface of the shell, it is prone to be worn during transportation, use and storage. After long-term use, the light feedback sensitivity and measurement accuracy of the rangefinder is reduced due to the wear, and the service life is reduced. For this reason, the present embodiment also provides the following technical solutions.

As shown in FIGS. 1 to 4, the shell 1 is provided with a laser beam emitting port 17 and a light receiving hole 18, and the laser beam emitting port 17 directly faces the light emitting surface 211, and the light receiving hole 18 directly faces the light receiving surface 221. Since the light emitting surface 211 and the light receiving surface 221 are adjacent to each other, the laser beam emitting port 17 and the light receiving hole 18 are also disposed adjacent to each other. In the present embodiment, the laser beam emitting port 17 and the light receiving hole 18 are both provided on the left side face 5 of the shell.

The light emitting surface 211 and the light receiving surface 221 are completely disposed inside the shell 1 instead of on the surface of the shell 1. The light emitting surface 211 and the light receiving surface 221 can be protected from abrasion, and the influences on the electrical device caused by the dust and the moisture in the surrounding environment can be reduced. It is possible to further improve the service life of the light emitting surface 211 and the light receiving surface 221 without affecting normal operations of the laser generating means 21 and the photoelectric conversion means 22, and to ensure the light feedback sensitivity and the measurement accuracy of the distance measuring device.

The laser generating means 21 emits a laser beam as a measuring light beam through the laser beam emitting port 17, and the photoelectric conversion means 22 captures external reflected light through the light receiving hole 18. Since the laser beam is always perpendicular to the plane where the laser beam emitting port 17 is located, the laser beam emitting port 17 is used to assist the user in aiming at the object to be measured, so that the laser beam can be directly irradiated to the object to be measured, and in order to ensure the reflection effect, the laser beam is preferably directly irradiated to a plane on the object to be measured, and making the laser beam be vertically irradiated to the plane as much as possible, so that more light can be reflected back to the distance measuring device, making the measurement results more accurate.

In the present embodiment, the center point of the light emitting surface 211 is located on the same straight line as the center point of the light receiving surface 221, and the closer the distance between the light emitting surface 211 and the light receiving surface 221 and between the light receiving hole 18 and the laser beam emitting port 17 is, the smaller the error is. Theoretically speaking, if the center point of the light emitting surface 211 completely coincides with the center point of the light receiving surface 221, the error is minimum, but it is currently difficult to realize.

In the conventional case, the area of the light receiving surface 221 is 3 to 10 times the area of the light emitting surface 211. Since the laser beam that is emitted can be kept along a straight line, after the laser beam is reflected by the surface of the object to be measured it is difficult to ensure sufficient intensity and amount of the light that can be returned along the original path back to the vicinity of the light emitting surface 211 if the object to be measured is not a mirror surface with excellent reflection effect, even if the laser beam can be irradiated vertically onto the object to be measured. Therefore, the area of the light receiving surface 221 may be appropriately enlarged to further improve the measurement accuracy and improve the feedback sensitivity.

Since the light emitting surface 211 and the light receiving surface 221 may be disposed in a side by side arrangement or in an up and down arrangement, the laser beam emitting port 17 and the light receiving hole 18 may thus also be disposed in a side by side arrangement or in an up and down arrangement. The laser beam emitting port 17 is slightly larger than the light emitting surface 211, and the light receiving hole 18 is slightly larger than the light receiving surface 221. Since the area of the light receiving surface 221 is normally 3 to 10 times the area of the light emitting surface 211, the area of the light receiving hole 18 is also 3 to 10 times the area of the laser beam emitting port 17.

In the present embodiment, the display means 24 is preferably a display screen provided on the outer surface of the shell 1 and connected to the processor 231 for displaying the distance from the object to be measured to the distance measuring device.

In the present embodiment, the operating means 25 is provided on the outer surface of the shell 1 and is connected to the processor 231 for transmitting at least one control instruction to the laser ranging device 21.

The operating means 25 includes an operation panel 251 and an operation circuit board 252. The operation panel 251 is preferably provided on the upper surface of the shell 1, or on the front surface or the rear surface of the shell 1. The operation panel 251 is used for inputting at least one control action, and each of the control actions corresponds to a control instruction. The operation circuit board 252 is disposed below the operation panel 251 and is connected to the processor 231. The operation circuit board 252 converts the at least one control action into at least one electrical signal and sends the electrical signal to the processor 231. Each of the electrical signals corresponds to a control instruction. In the present embodiment, the operation panel 251 is provided with three keys 253 corresponding to three control instructions respectively, namely, a start instruction, a close instruction, a storage instruction for starting the distance measuring device, closing the distance measuring device or storing the distance from the object to be measured to the distance measuring device.

The user operates the operation panel 251, presses a certain button to input a control instruction, and the operation panel 251 simultaneously records a control action, and the operation circuit board 252 converts the control instruction inputted by the user using the key into an electric signal, and according to the key that is pressed, an electrical signal containing a control instruction is transmitted to the processor 231.

The operation panel 251 may also be provided with other keys 253 to input more control instructions.

In order to facilitate user operation and use, the display means 24 and the operating means 25 of the present embodiment are preferably provided on the upper surface of the shell 1 (the outer surface of the top surface 15), and the user looks down and can readily see the operation panel 251 and operate the distance measuring means as well as read the readings of the distance to be measured. The display means 24 and the operating means 25 can be integrally designed, that is, adopting a touch screen, and an operation control function and a reading display function are realized at the same time. Due to the high cost of the touch screen, this scheme is still more or less limited in applications.

In the present embodiment, the power supply 26 may be a button battery, a rectangular battery or two parallel-arranged cylindrical batteries. The size of a button battery is small, taking up small space, and the distance measuring device can be provided in a smaller size. However, the button battery is limited in power, users need to frequently replace the battery, resulting in high cost in use. Rectangular cells, cylindrical batteries have greater battery power than the button battery, needing less times of battery replacement, which can reduce the cost in use, but the size thereof are larger, which makes it inconvenient to carry. Both of the rectangular battery and the cylindrical battery may be a rechargeable battery, thereby further reducing the cost in use.

The present embodiment also provides a fixed mounting plate (not shown), which can be connected and fixed to the shell 1 by means of a screw nut or the like, and the laser generating means 21, the photoelectric conversion means 22, the circuit board 23, the tapeline structure 3, etc. can be all mounted on the fixed mounting plate.

The technical effect of the first embodiment is to provide a laser ranging device capable of independently realizing the ranging function, which can effectively protect the light emitting surface of the laser generating means and the light receiving surface of the photoelectric conversion device as compared with conventional laser ranging device, reducing unnecessary wear, having good dustproof and waterproof effect, effectively prolonging the service life of components, and ensuring relatively high light feedback sensitivity and higher measurement accuracy even after long-term use.

Embodiment 2

The distance measuring device according to Embodiment 1 only has a laser ranging function and is more suitable for long distance ranging, and in a case where the distance to be measured is shorter, for example, when the distance to be measured is less than 1 m or 2 m, the error of the laser ranging device will be quite large and the measurement accuracy will be lower.

Figure 6:
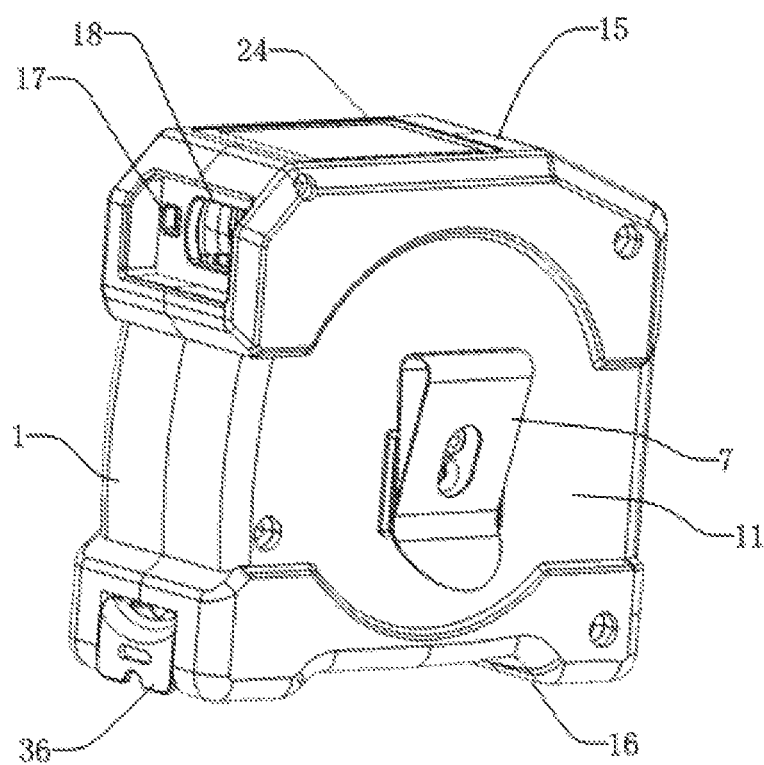
FIG. 6 is an overall structural schematic view of Embodiment 2 of the invention.
Figure 7:
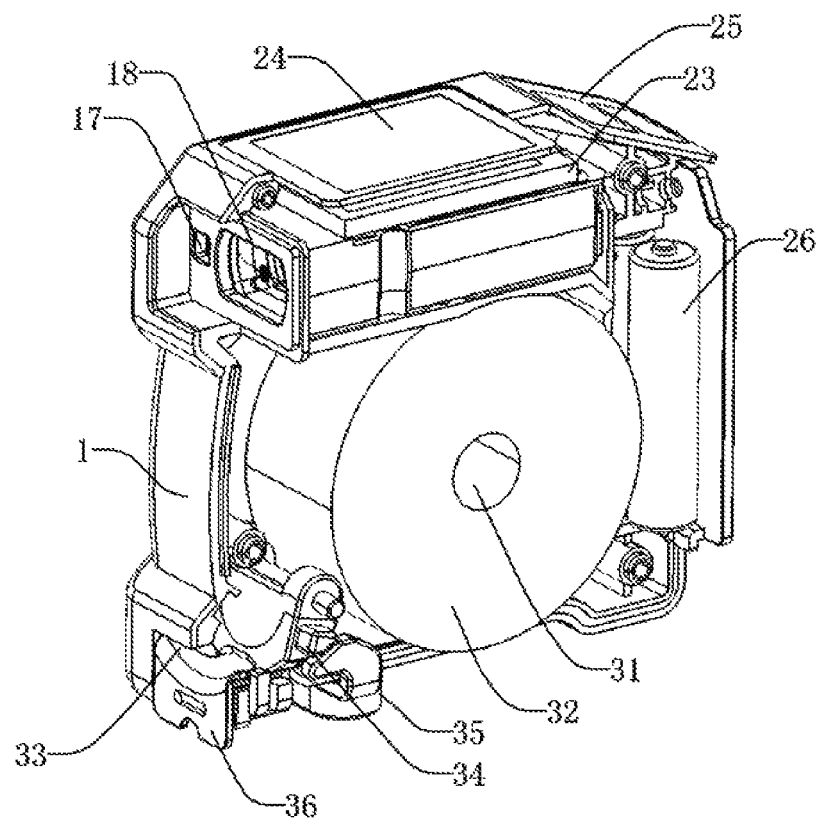
FIG. 7 is a structural schematic view of Embodiment 2 after the front side face of the shell is opened.
Figure 8:
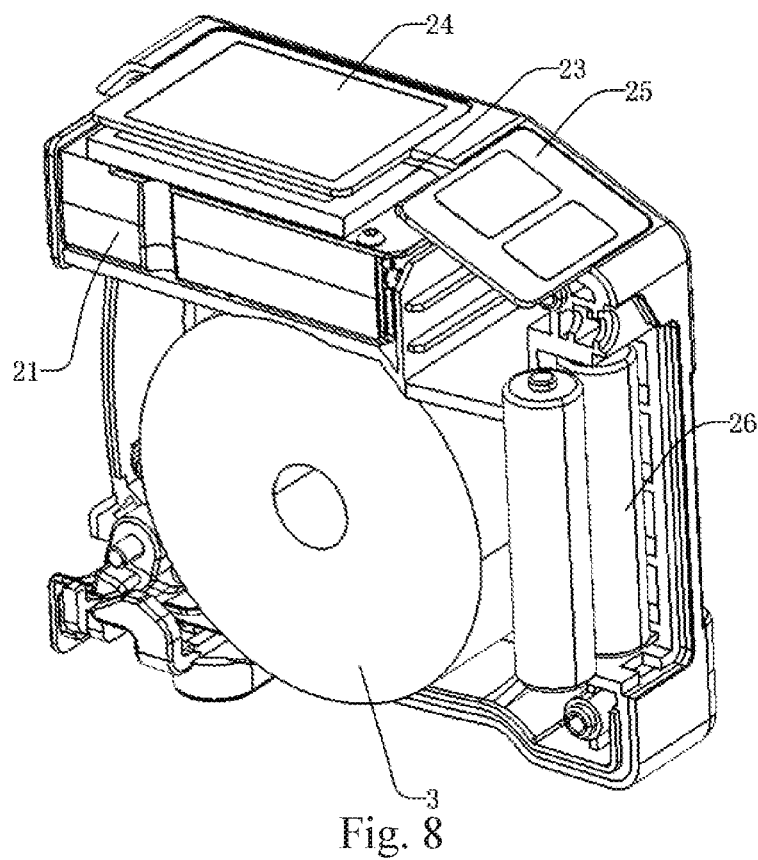
FIG. 8 is a structural schematic view of Embodiment 2 of the invention viewed from another angle after the front side face of the shell is opened.

In view of this, Embodiment 2 provides another technical solution, which includes all the technical solutions of Embodiment 1, and the distinguishing technical feature is characterized in that, as shown in FIGS. 6-8, a tapeline structure 3 is also provided in the shell 1. In the shell 1, the laser ranging device 2 and the tapeline structure 3 are provided at the same time, and the gap of the shell can be reduced to enhance the dustproof and waterproof effects.

As shown in FIGS. 6-8, the tapeline structure 3 includes a tapeline wheel 31, a tape 32, a tape outlet 33, a pressure piece 34, and a locking key 35. The tapeline wheel 31 is provided in the shell 1; the tape 32 is wound on the tapeline wheel 31 in whole or in part; one end of the tape 32 is fixedly connected to the tapeline wheel 31 and the other end is provided with a tape end portion 36. The tape outlet 33 is provided at the lower end of the outside wall of the shell 1, and the tape end portion 36 extends beyond the shell 1 through the tape outlet 33, and the pressure piece 34 is provided inside the shell 1 and near the tape outlet 33. When the tape 32 is pulled out of the shell 1, the pressure piece 34 can be used to press the tape 32 so that the length of the tape 32 outside the shell 1 is kept constant. The locking key 35 is provided on the outer surface of the shell 1 for controlling the pressure piece 34 to press or loosen the tape 33.

The tapeline structure 3 may also be any of the prior art tapelines. In the work, the tape 32 is pulled out of the shell 1 by the tape end portion 36 to perform the measurement. After the measurement, it is necessary to press down the locking key 35, in which the pressure piece 34 presses the tape 32 so that the length of the tape 32 outside the shell 1 remains constant so as to allow reading of the length of the tape 32.

In the present embodiment, the locking key 35 is a key provided on the bottom surface 16 of the shell 1, and after the first pressing, the pressure piece 34 presses the tape 32; after reading the length value, and after pressing again, the pressure piece 34 releases the tape 32, and after the length of the tape 32 is read, the tape 32 is retracted into the interior of the shell 1.

The tapeline structure 3 is preferably as the following scheme: the width of the tape 32 is less than or equal to 2 cm, preferably 1 cm; the length of the tape 32 is less than or equal to 2 m, and the volume of the tape 32 wound on the tapeline wheel 31 is effectively reduced, the space occupied by the tape 32 in the distance measuring device is reduced, and the width of the distance measuring device is reduced. For the combination of the laser generating means 21 and the photoelectric conversion means 22, the measurement accuracy will be relatively higher, if the object to be measured is 2 m or more, so the tape length of the tape reaching 2 m will make the present embodiment applicable in various situations.

In the present embodiment, the circuit board 23 is located above the tapeline structure 3 and near the top portion of the shell 1, which can prevent the circuit board from being pressed by other components in the tapeline structure 3, and prevent the various components on the circuit board 23 from being damaged caused by being pressed.

As shown in FIGS. 6 to 7, in the present embodiment, the laser generating means 21 and the photoelectric conversion means 22 are located above the tapeline structure 3, and the laser generating means 21 and the photoelectric conversion means 22 are disposed in a side by side arrangement to appropriately increase the overall height of the distance measuring device. If the laser generating means 21 and the photoelectric conversion means 22 are disposed in an up and down arrangement, the distance measuring device would be too tall and inconvenient to carry. The laser generating means 21 and the photoelectric conversion means 22 may also be both located below the tapeline structure 3, which will not be further described here.

As shown in FIGS. 7-8, the power supply 26 is preferably two cylindrical or rectangular batteries having a thickness less than the shell 1, either vertically or obliquely provided on the left or right side of the tapeline structure 3, so as to appropriately increase the overall width of the distance measuring device. If the cylindrical batteries are provided above or below the tapeline structure 3, the height of the distance measuring device is further increased, so that the appearance of the distance measuring device is incongruous, making it inconvenient to carry and use the device.

As shown in FIG. 6, the front side face 11 of the shell 1 is also provided with a clip 7 which allows the user to attach the distance measuring device on the belt on the waist by means of the clip 7 for easy carrying.

The technical effect of the second embodiment is to provide a distance measuring device in which the laser ranging device and the tapeline structure are arranged inside the same shell so that the distance measuring device has both a long distance ranging and a short distance ranging function, effectively enhancing the dustproof and waterproof effect at the same time. The thickness of the distance measuring device according to the second embodiment is similar to that of the conventional tapeline, and is convenient for hand gripping, and is convenient for the user to operate and use in the work.

Embodiment 3

The distance measuring device according to the second embodiment increases the height and the width of the distance measuring device to a certain extent, so that the occupancy area of the distance measuring device is relatively large and the device is inconvenient to carry.

Figure 9:
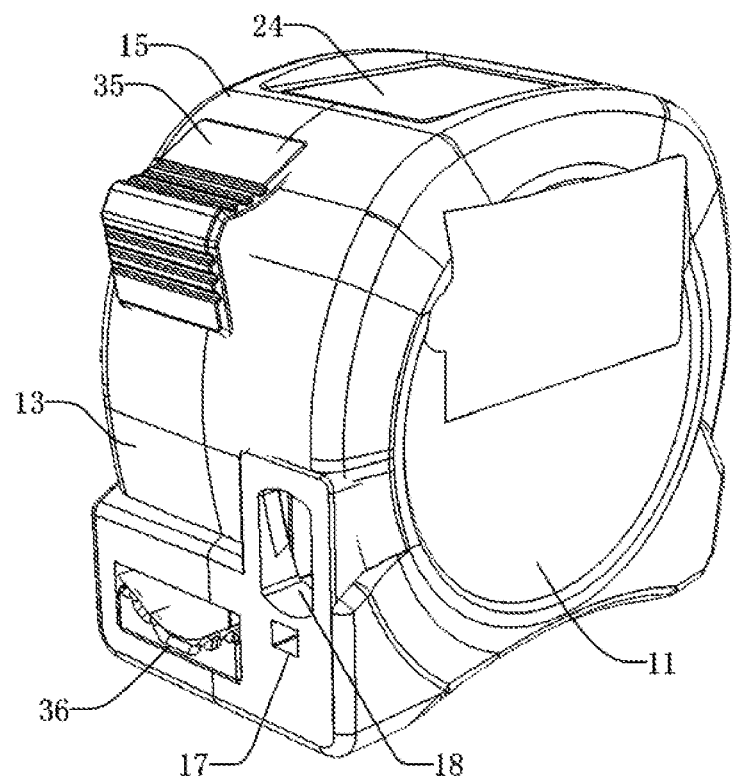
FIG. 9 is an overall structural schematic view of Embodiment 3 of the invention.

For this reason, Embodiment 3 provides another technical solution. Embodiment 3 includes most of the technical solutions of Embodiment 3, and the distinguishing technical feature is characterized in that, as shown in FIGS. 9-11, the power supply 26, together with the laser generating means 21 and the photoelectric conversion means 12, are simultaneously located in front of the tapeline structure 3, increasing the thickness of the distance measuring device to a certain extent and effectively reducing the height and width of the distance measuring device.

Figure 10:
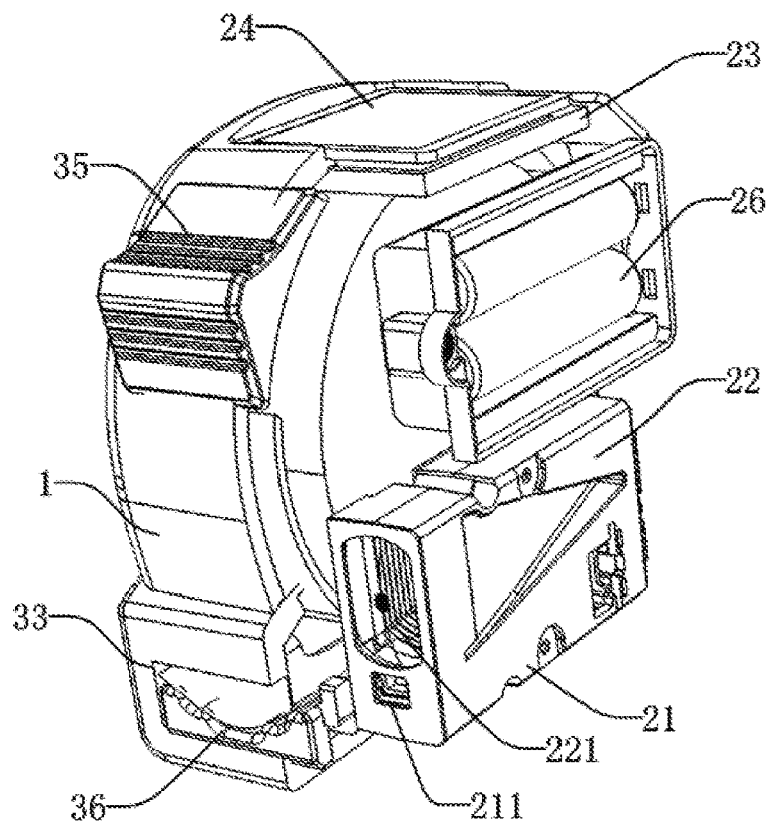
FIG. 10 is a structural schematic view of Embodiment 3 of the invention after the front side face of the shell is opened.
Figure 11:
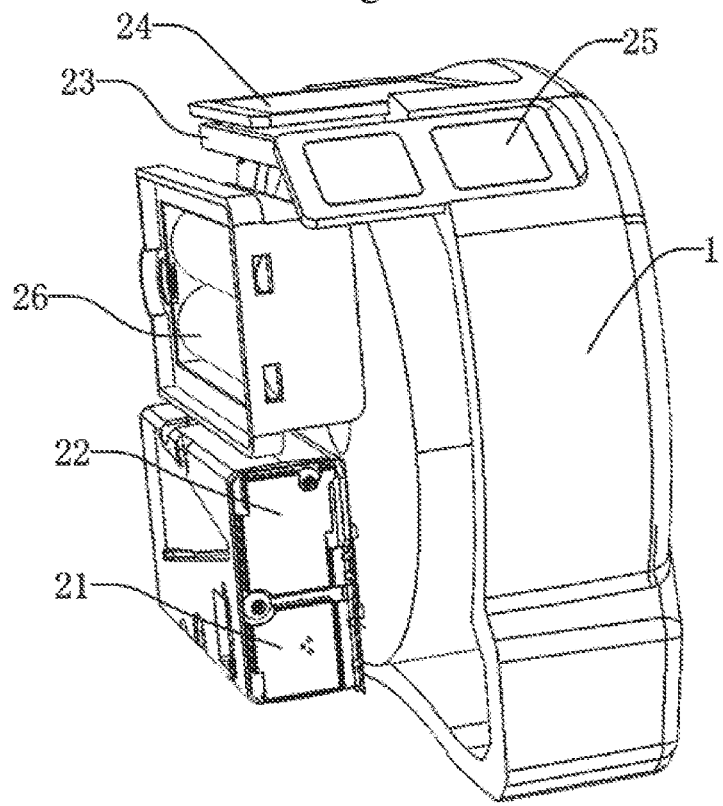
FIG. 11 is a structural schematic view of Embodiment 3 of the invention viewed from another angle after the front side face of the shell is opened.

Another distinguishing technical feature of Embodiment 3 relative to Embodiment 2 is that, as shown in FIGS. 10-11, the laser generating means 21 and the photoelectric conversion means 22 are located below the power supply 26, the power supply 26 is a cylindrical battery or a rectangular battery, the thickness of which is relatively small, so that the thickness of the distance measuring device will not be too large. Similarly, alternatively, the laser generating means 21 and the photoelectric conversion means 22 may also be located above the power supply 26.

Another distinguishing technical feature of Embodiment 3 relative to Embodiment 2 is characterized in that, as shown in FIGS. 10 to 11, the laser generating means 21 and the photoelectric conversion means 22 are disposed in an up and down arrangement, and the laser generating means 21 is located directly below the photoelectric conversion means 22, thereby appropriately increasing the overall thickness of the distance measuring device so that the thickness of the distance measuring device is not so large. If the laser generating means 21 and the photoelectric conversion means 22 are disposed in a side by side arrangement, the thickness of the distance measuring device will be too large, and it is difficult to be gripped by a hand and the operation is inconvenient.

Similarly, the power supply 26 together with the laser generating means 21 and the photoelectric conversion means 22 may be simultaneously located behind the tapeline structure 3, and the principle thereof is similar to that in the foregoing case and will not be described here.

As shown in FIGS. 9 and 10, the locking key 35 is a sliding key provided on the left side face 13 or the right side face 14 of the shell 1. The locking key 35 can be slid back and forth to effect the pressing or releasing of the tape 32. The locking key 35 may also be a key provided on the bottom surface 16 of the shell 1 in Embodiment 2.

The display means 24 and the operating means 25 of the present embodiment are preferably provided on the upper surface of the shell 1 (the outer surface of the top surface 15) in order to facilitate the operation and use by the user. Once looking down, the user can readily operate the device, and read the distance to be measured. Since the thickness of the distance measuring device described in Embodiment 1 is larger than that of the distance measuring device described in Embodiment 2, the display means 24 can be wider and larger, the display of font is larger and clearer, which further improves the user experience of the reading process.

The technical effect of Embodiment 3 is to provide such a distance measuring device that the distance measuring device has both a long distance ranging and a short distance ranging function, and the laser ranging device and the tapeline structure are arranged in the same shell, further reducing the overall volume, the height and the width of the product. The height and width of the distance measuring device described in Embodiment 3 are similar to those of the conventional tapelines, making it easier for the user to carry, and to operate and use in the work.

Embodiment 4

The distance measuring device according to Embodiment 2 increases the height and the width of the distance measuring device to a certain extent, so that the distance measuring device occupies a relatively large area and is inconvenient to carry. The distance measuring device according to Embodiment 3 increases, to a certain degree, the thickness of the distance device, and the users will hold it in their hands, making the operation inconvenient.

Figure 12:
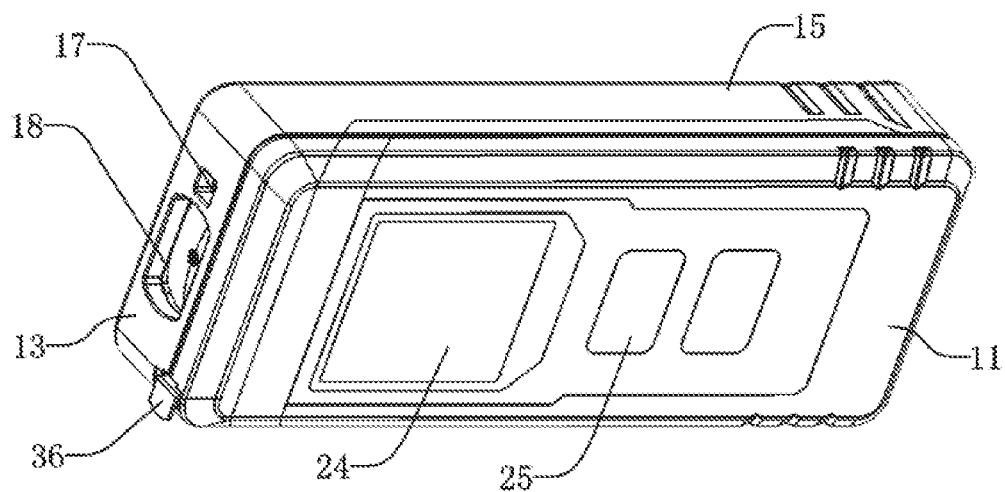
FIG. 12 is an overall structural schematic view of Embodiment 4 of the invention.

For this reason, Embodiment 4 provides another technical solution. Embodiment 4 includes most of the technical solutions of Embodiment 3, and the distinguishing technical feature is characterized in that, as shown in FIGS. 12 to 14, the power supply 26 is located behind the tapeline structure 3 to reduce the height or width of the distance measuring device.

Figure 13:
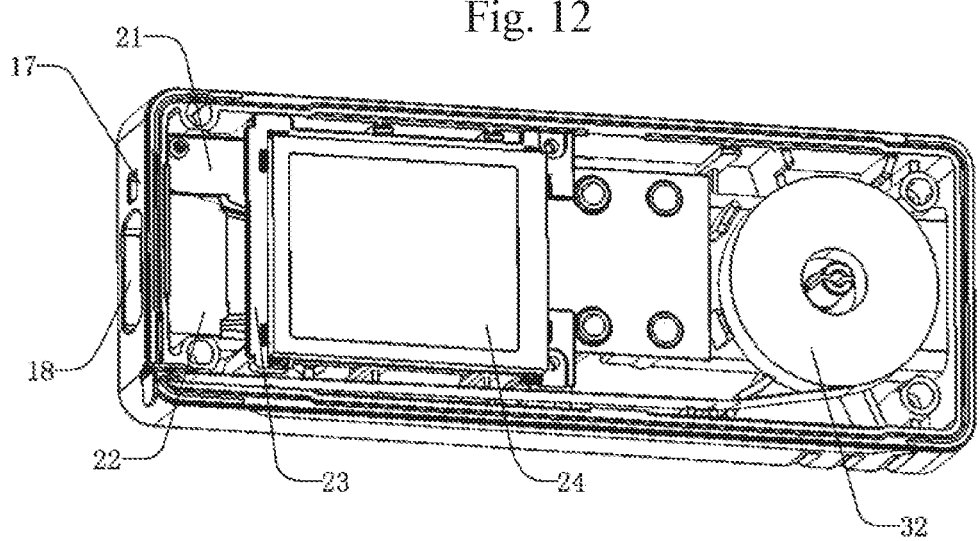
FIG. 13 is a structural schematic view of Embodiment 4 of the invention after the front side face of the shell is opened.
Figure 14:
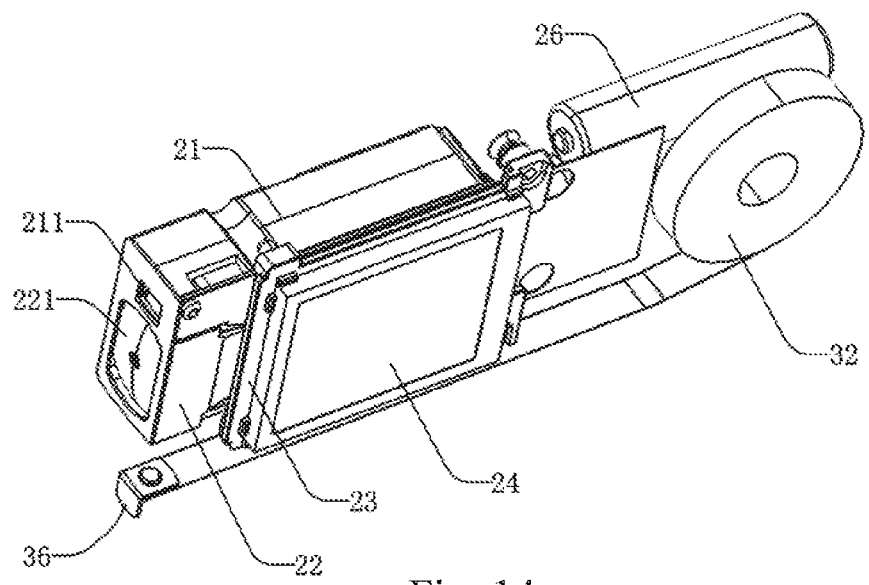
FIG. 14 is a structural schematic view of Embodiment 4 of the invention after the shell is removed.

Another distinguishing technical feature of Embodiment 4 relative to Embodiment 3 is characterized in that, as shown in FIGS. 13 to 14, the laser generating means 21 and the photoelectric conversion means 22 are located on the left side of the tapeline structure 3; the power supply 26 is a cylindrical battery or a rectangular battery of a smaller diameter, having a relatively smaller thickness, so that the thickness of the distance measuring device is not so large.

Another distinguishing technical feature of Embodiment 4 relative to Embodiment 3 is characterized in that, as shown in FIGS. 13 to 14, the circuit board 23 and the display means 24 are vertically disposed on the left side of the tapeline structure 3; the laser generating means 21 and the photoelectric conversion means 22 are located behind the circuit board 23, and the display means 24 is located in front of the circuit board 23.

The display screen in the display means 24 and the operation panel 251 of the operating means 25 are provided on the front surface of the shell 1 (outer surface of the front side face 11). Since the area of the front side face 11 and the rear side face 12 of the display means are relatively large, the display screen of the display means 24 and the keys of the operating means 25 can be provided larger, making the operation more convenient and the display clearer. Circuit board 23 and the display means 24 are vertically provided to save more space and reduce the width of the distance measuring device.

The laser generating means 21 and the photoelectric conversion means 22 are disposed in an up and down arrangement, and the laser generating means 21 is located just below the photoelectric conversion means 22, thereby limiting the thickness of the entire distance measuring device. If the laser generating means 21 and the photoelectric conversion means 22 are disposed in a side by side arrangement, the thickness of the distance measuring device will be too large, and it is difficult to be gripped by hands and the operation is inconvenient.

Similarly, alternatively, the power supply 26 may be located in front of the tapeline structure 3, the laser generating means 21 and the photoelectric conversion means 22 may be located on the right side of the power supply 26, and the circuit board 23 and the display means 24 may be vertically provided on the right side of the tapeline structure 3. The display screen in the display means 24 and the operation panel 215 of the operating means 25 may be provided on the rear surface of the shell 1 (outer surface of the rear side face 12).

The technical effect of Embodiment 4 is to provide a distance measuring device having functions of long distance ranging and short distance ranging; and setting the laser ranging device and the tapeline structure in the same shell further reduces the overall volume, the height and the thickness of the product; the height and the thickness of the distance measuring device described in Embodiment 4 may be smaller than the ordinary tapeline, making it more convenient to be carried by users; and the display means and the operating means of the distance measuring device described in Embodiment 4 are relatively large, facilitating operation and reading by users.

Embodiment 5

In Embodiments 2-4, the laser ranging device and the tapeline structure are arranged in the same shell, and the volume is significantly larger than that of the ordinary tapeline, the space occupied is relatively large, and it is inconvenient to be carried to a certain extent. For the user, in some special occasions, the user only needs to use the tapeline function or laser ranging function, without the need to use multi-functional laser ranging device. In addition, in Embodiments 2-4, the number of components in the shell is larger, the assembly line is long, the process is difficult, and the production efficiency is low.

Figure 15:
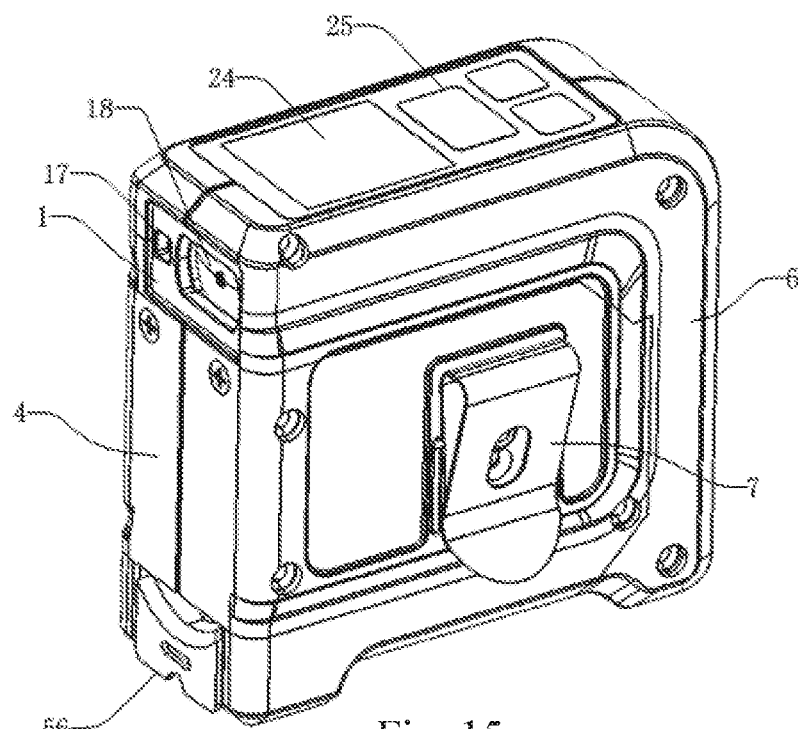
FIG. 15 is an overall structural schematic view of Embodiment 5 of the invention.
Figure 16:
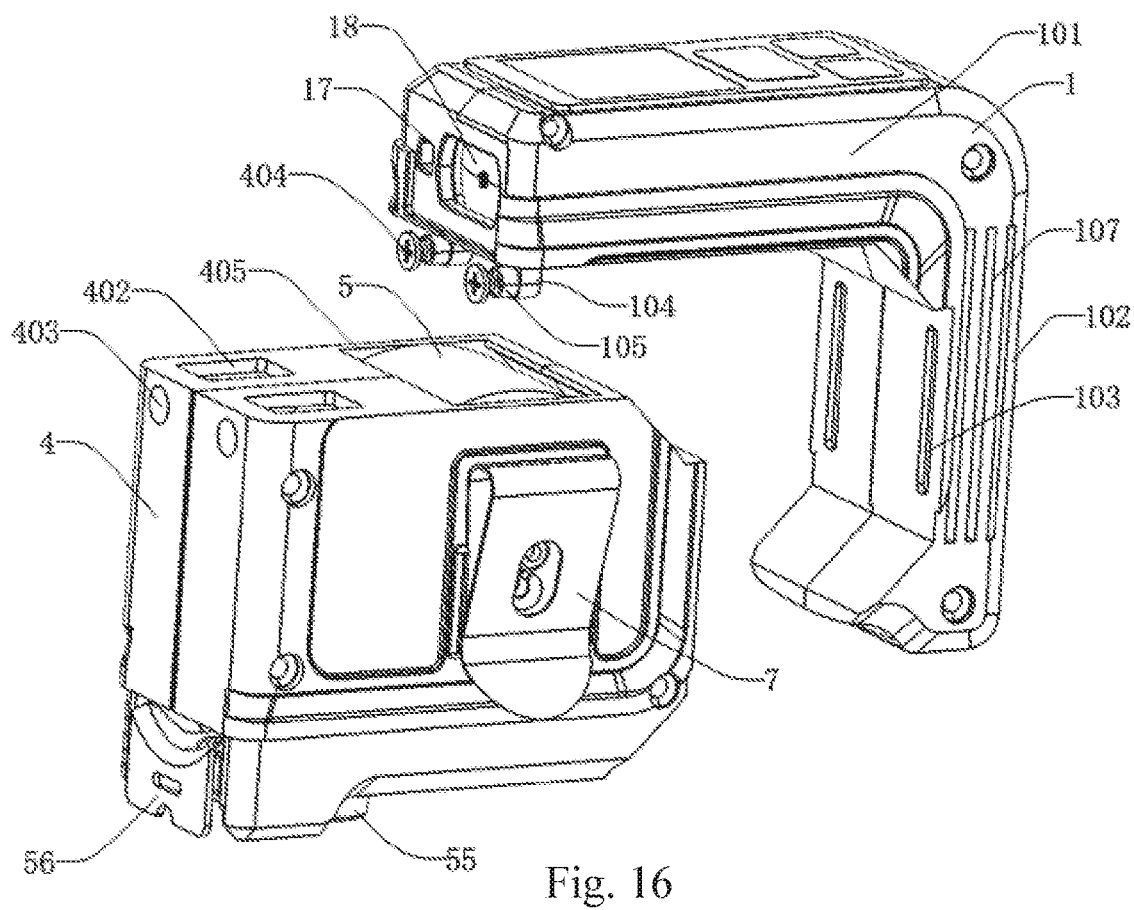
FIG. 16 is an exploded structural schematic view of Embodiment 5 of the invention.

In view of this, Embodiment 5 provides another solution, where Embodiment 5 includes all the technical solutions of Embodiment 1 and the distinguishing technical feature is characterized in that, as shown in FIGS. 15 to 16, the present embodiment may also include a second tapeline structure 5 provided inside the second shell 4, and the second shell 4 is detachably connected to the shell 1.

The connection between the second shell 4 and the shell 1 may be respectively provided with connecting means corresponding to each other, for example, a plurality of bayonets are designed on one side of the shell 1, a plurality of buckles corresponding to the bayonets are designed on one side of the second shell 4; when they are engaged with each other, they can be integrally fixed together and can have both short distance measurement and long distance measurement functions. The second shell 4 and the shell 1 may be connected in an up and down, left and right or front and rear relation.

Figure 19:
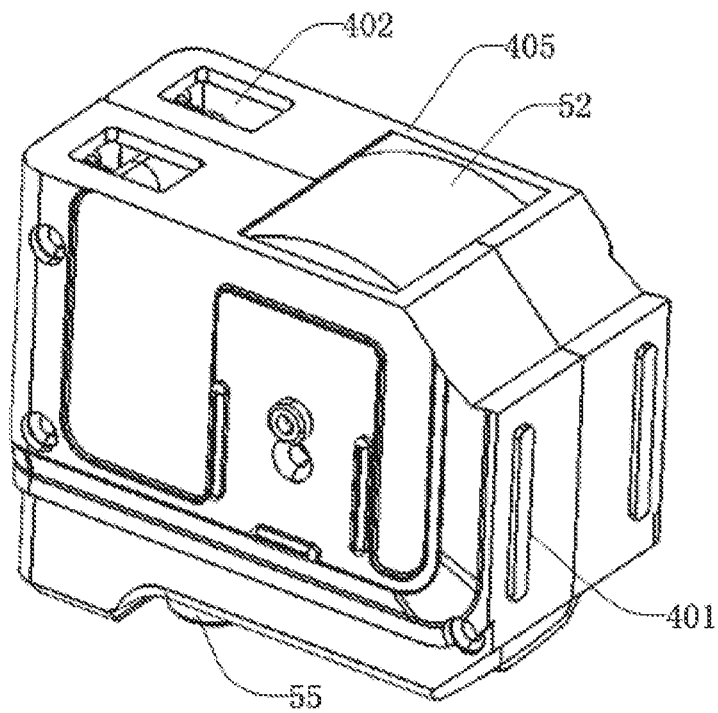
FIG. 19 is a structural schematic view of the second shell in Embodiment 5 of the invention.
Figure 20:
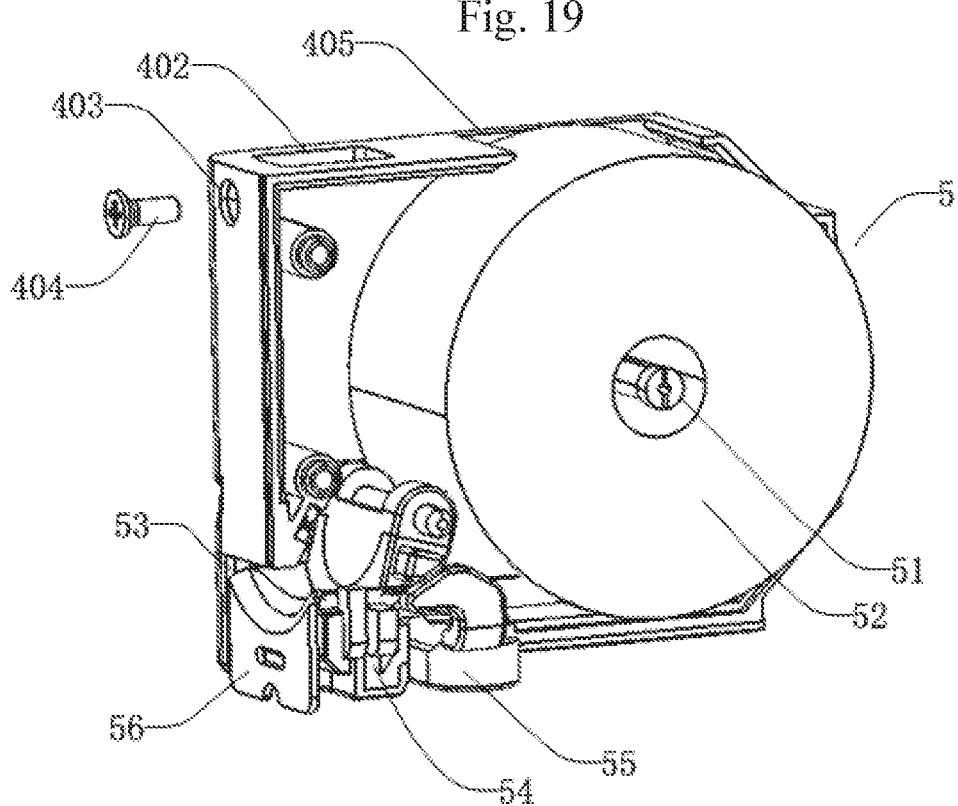
FIG. 20 is a structural schematic view of Embodiment 5 of the invention after the front side face of the second shell is opened.

As shown in FIGS. 19-20, the second tapeline structure 5 includes a second tapeline wheel 51, a second tape 52, a second tape outlet 53, a second pressure piece 54, and a second locking key 55. The second tapeline wheel 51 is provided inside the second shell 4, the second tape 52 is entirely or partially wound on the second tapeline wheel 51, and one end of the second tape 52 is fixedly connected to the second tapeline wheel 51, and a second tape end 56 is provided at the other end. The second tape outlet 53 is provided at the lower end of the outer side wall of the second shell 4, the second tape end 56 extends beyond the second shell 4 through the second tape outlet 53, and the second pressure piece 54 is provided inside the second shell 4 and near the second tape outlet 53. When the second tape 52 is pulled out of the second shell 4, the second pressure piece 54 may be used to press the second tape 52 such that the length of the second tape 52 outside the second shell 4 is kept constant; and the second locking key 55 is provided on the outer surface of the second shell 4 for controlling the second pressure piece 54 to press or loosen the second tape 53.

The interior of the second tapeline structure 5 may be any of the prior art tapelines. In the work, the second tape 52 is pulled out of the second shell 4 by means of the second tape end 56 to complete the measurement, and after the measurement, the second locking key 55 needs to be pressed or toggled, the second pressure piece 54 therein presses the second tape 52 so that the length of the second tape 52 outside of the second shell 4 remains constant so as to facilitate reading the indicated number of the length of the second tape 52.

The second locking key 55 may be a sliding key provided on the left side face or the right side face of the second shell 4, and the second tape 52 may be pressed or loosened by sliding the second locking key 55 forward and backward. The second locking key 55 may be a button (not shown) provided on the bottom surface of the second shell 4, and after the first pressing, the second pressure piece 54 presses the second tape 52; after reading the indicated number of the length, the second pressure piece 54 loosens the second tape 52 after the button is pressed again.

As shown in FIG. 16, the front side face of the second shell 4 is provided with a clip 7 which allows the user to attach the distance measuring device on the belt on the waist by means of the clip 7 for easy carrying.

Figure 17:
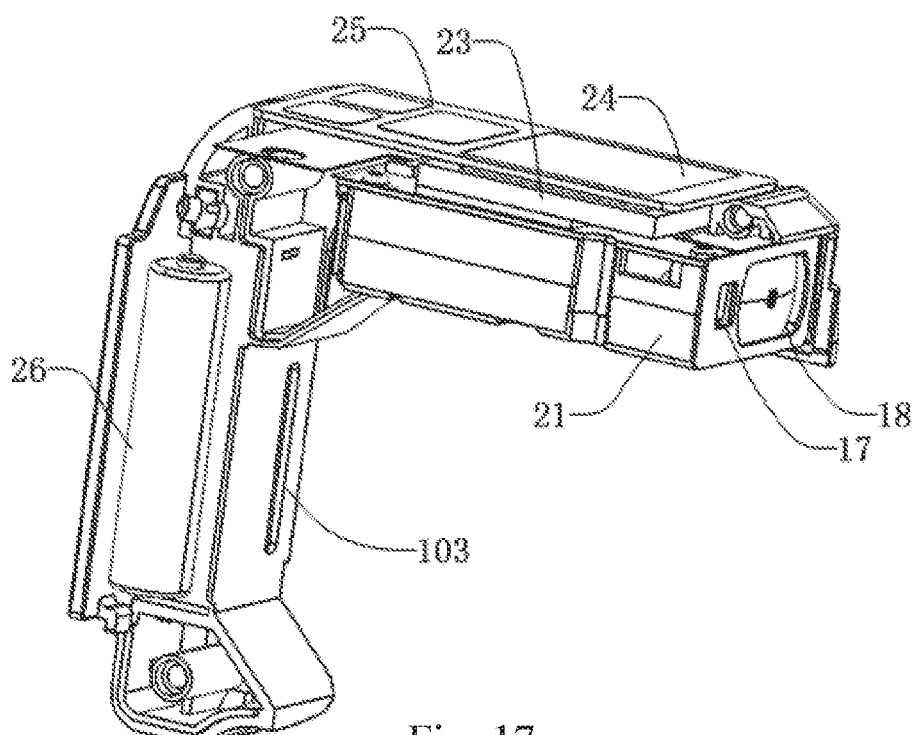
FIG. 17 is a structural schematic view of Embodiment 5 after the back side face of the shell is opened.
Figure 18:
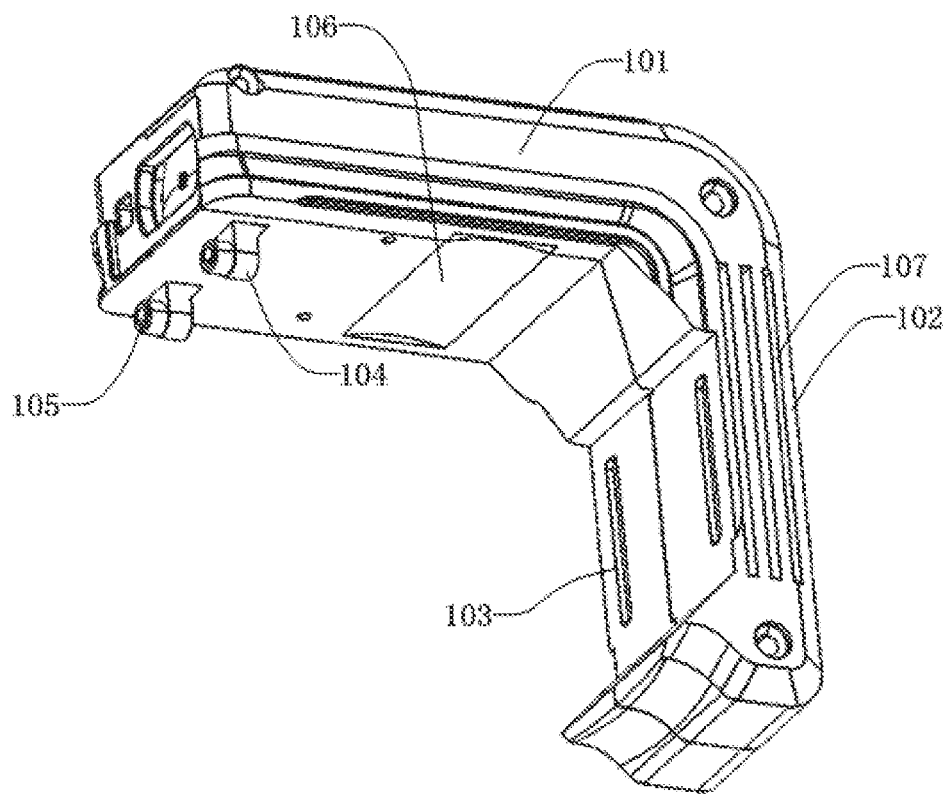
FIG. 18 is a structural schematic view of the left lower side face of the shell in Embodiment 5 of the invention.

As shown in FIGS. 16 to 18, in the present embodiment, the shell 1 is an approximately inverted L-shape, similar to the "]" shape, the front side face 11 and the rear side face 12 of the shell 1 are approximately inverted L-shape. The shell 1 includes a horizontal portion 101 and a vertical portion 102, the horizontal portion 101 is horizontally provided on the upper portion of the shell 1; the vertical portion 102 is located at the lower portion of the shell 1, and the upper end of the vertical portion 102 is the right end of the horizontal portion 101; the shell 1 is an inverted L-shape, and there is a certain space at the lower left of the shell, which can accommodate the second shell 4, and the second shell 4 is detachably connected to the lower left of the shell 1.

The shell 1 includes at least one first snap slot 103 which is recessed on the left side face of the vertical portion 102 of the shell 1; the second shell 4 includes at least one first strip 401, and the first strip 401 protrudes from the right side face of the second shell 4; when the second shell 4 is connected to the shell 1, the first strip 401 is engaged with the first snap slot 103. In the present embodiment, two vertically-provided first snap slots 103 and two vertically-provided first strips 401 are preferred. When the second shell 4 is connected to the lower left of the shell 1, the first strip 401 is engaged with the first snap slot 103 and acts as a stopper, so that the second shell 4 and the shell remain relatively fixed.

The shell 1 includes at least one connecting member 104, each of which projects downwardly from the bottom surface of the horizontal portion 101 of the shell 1; the connecting member 104 is located near the left side face of the shell 1; each connecting member 104 is provided with a horizontally oriented nut 105, and the nut 105 faces the left side of the shell 1. The second shell 4 includes at least one connecting through hole 402, at least one screw hole 403 and at least one screw 404. Each connecting through hole 402 is vertically penetrated through the top surface of the second shell 4 and its position is corresponding to the position of the connecting member 104. The screw hole 403 is horizontally penetrated though the left side face of the second shell 4. When the second shell 4 is connected to the shell 1, the connecting member 104 passes through the connecting through hole 402; each nut 105 corresponds to a screw hole 403, and the nuts 105 and the screw holes 403 corresponding to each other are located on the same straight line; each screw 404 is passed through a screw hole 403 and is fixed to the nut 105 corresponding to the screw hole 403. In the present embodiment, two connecting members 104 and two connecting through holes 402 are preferred. When the second shell 4 is connected to the lower left of the shell 1, the two connecting members 104 are inserted into the two connecting through holes 402, the two nuts 105 are opposed to the two screw holes 403, the two screws 404 are inserted into the nut 105 from the screw holes 403 on the left side face of the second shell 4, so that the two are fixed to each other.

The second shell 4 includes a rectangular through hole 405 vertically extending through the top surface of the second shell 4 and located above the second tapeline wheel. The shell 1 comprises an arcuate groove 106 recessed on the bottom surface of the shell 1 and located above the rectangular through hole 405. When the second shell 4 is connected to the shell 1, the upper portion of the second tape 52 wound on the second tapeline wheel 51 passes through the rectangular through hole 405 and is placed in the arcuate groove 106. When the second tape 52 is fully wound on the second tapeline wheel 51, a tapeline disk is formed with a relatively large volume, and the rectangular through hole 405 and the arcuate groove 106 are provided so as to minimize the volume of the distance measuring device to facilitate carrying and use.

In the present embodiment, the shell 1 and the second shell 4 can be relatively fixed only by two sets of screws and nuts as a connecting member, and the advantage is that the removal and installation are convenient and the user can easily detach the two as desired and can only carry or use a part of or the assembled whole part therein; the deficiency lies in that the shell 1 and the second shell 4 are relatively fixed only by the two sets of screws and nuts, and the connection structure is simple and not strong and reliable enough, and it is possible to cause damage to the connection structure upon hitting or dropping, making the two separate and cannot be connected again. For this reason, the present embodiment further provides the following technical solutions.

As shown in FIG. 15, the distance measuring device according to the present embodiment may further include a shell outer casing 6 which is a "concave" shape in a transverse direction; when the second shell 4 is connected to the shell 1, the shell outer casing 6 is coated on the outer surface of the shell 1 and the second shell 4. The shell outer casing 6 may be made of hard material (such as hard plastic, stainless steel, etc.), or elastic material (such as rubber, etc.) may be used so that the combination of the second shell 4 and the shell 1 is more stable, so that the two are not easily separated from each other and at the same time can also play a protective role.

Figure 21:
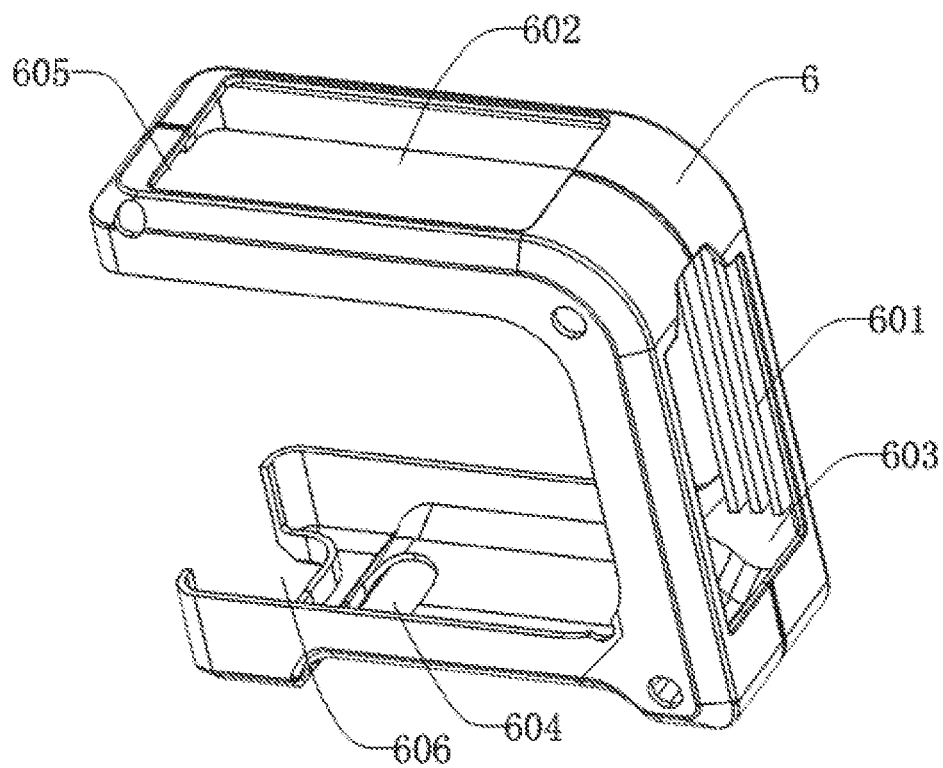
FIG. 21 is a structural schematic view of the outer casing of the shell in Embodiment 5 of the invention.
Figure 22:
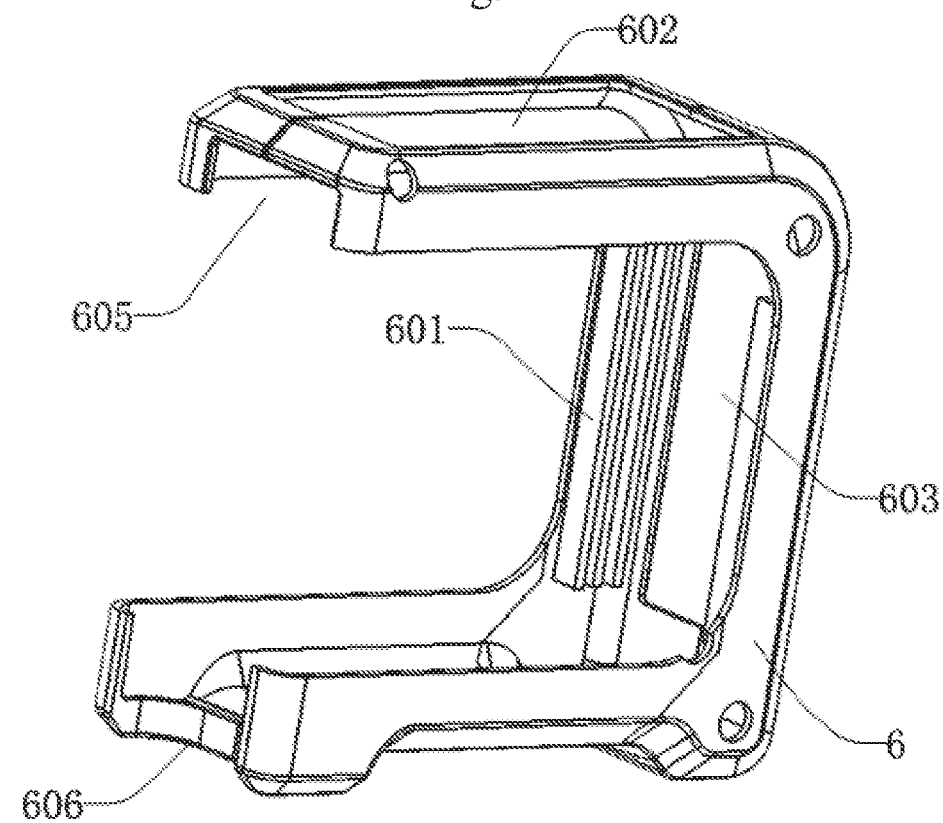
FIG. 22 is a structural schematic view of the outer casing of the shell in Embodiment 5 of the invention viewed from another angle.

As shown in FIG. 18, the shell 1 includes at least one second snap slot 107 which is recessed into the front side face and the rear side face of the vertical portion 102 of the shell 1. As shown in FIGS. 21 and 22, the shell outer casing 6 includes at least one second strip 601 projecting from the inner side face of the shell outer casing 1 and corresponding to the second snap slot 107. When the shell outer casing 6 is coated on the outer surface of the shell 1, the second strip 601 is engaged to the second snap slot 107 so that the shell 1 and the shell outer casing 6 are relatively fixed.

The shell 1 and the shell outer casing 6 are provided with a plurality of corresponding screw holes (not shown) respectively. After the shell outer casing 6 is coated on the outer surface of the shell 1, the shell outer casing 6 is fixed to the shell 1 by means of a plurality of screws so that the second shell 4 and the shell 1 are less likely to be disengaged from each other, so that the combination of the two is more stable. This structure can protect the shell 1 and the shell outer casing 6 better because of the large number of fasteners, but it is generally not advisable for the user to separate the shell 1 and the second shell 4 to use due to the inconvenience of detaching.

As shown in FIGS. 21 and 22, the shell outer casing 6 includes a first outer casing through hole 602, a second outer casing through hole 603, a third outer casing through hole 604, a first outer casing notch 605, and a second outer casing notch 606. The first outer casing through hole 602 passes through the top surface of the shell outer casing 6, corresponding to the display means 24 and the operating means 25, whereby the user can perform the control operation and the data reading. The second outer casing through hole 603 penetrates through the right side face of the shell outer casing 6, corresponding to the power supply 26, and the box cover of the battery box is located where the power supply 26 is exposed at the outer wall of the shell 1, and whereby the battery can be replaced by the user. The third outer casing through hole 604 passes through the bottom surface of the shell outer casing 6 corresponding to second locking key 55, whereby the user can lock the tape. The first outer casing notch 605 is provided on the left side face of the upper portion of the shell outer casing 6 and corresponds to the laser generating means 21 and the photoelectric conversion means 22; the second outer casing notch 606 is provided on the left side face of the lower portion of the shell outer casing 6, corresponding to the second tape outlet 53 so as to ensure that the shell outer casing 6 does not affect the normal operation and use of the laser ranging device and the tapeline structure.

The technical effect of Embodiment 5 is to provide a distance measuring device comprising a detachable laser ranging device and a tapeline structure, both of which can be operated independently, and the user can separate the two or combine them into one as needed to carry or use. When the two are fixed to each other as a whole, it can be applied to both long distance ranging and short distance ranging. The distance measuring device according to Embodiment 5 designs the product as two modules: a laser ranging device and a tapeline structure, which can be produced separately and then assembled into a whole. Such a modular design can effectively improve the production efficiency of the product.

The preferred specific embodiments of the invention have been described in detail above. It is to be understood that numerous modifications and variations can be made by those ordinary skilled in the art in accordance with the concepts of the present invention without departing from the principles of the present invention. The numerous modifications and variations should also be regarded as within the scope of protection defined by the claims.

The invention claimed is:
1. A distance measuring device, comprising:
a shell; and
a laser ranging device, provided at the inside and/or the outer surface of the shell;
wherein the laser ranging device comprises
a laser generating means, used for emitting measurement beam to the object to be measured; the object to be measured reflects the measurement beam, generating reflected light;
a photoelectric conversion means, used for capturing all or part of the reflected light and converting the optical signal of the captured reflected light into at least one feedback electrical signal;
a circuit board on which at least one processor is provided; and
a power supply connected to the laser generating means, the photoelectric conversion means and the circuit board;
wherein the processor is connected to the laser generating means for controlling the laser generating means;
the processor is connected to the photoelectric conversion means for acquiring the feedback electrical signal and calculating a distance from the object to be measured to the distance measuring device.
2. The distance measuring device according to claim 1, wherein
the laser generating means comprises a light emitting surface;
the photoelectric conversion means comprises a light receiving surface provided beside the light emitting surface;
wherein the light emitting surface and the light receiving surface are disposed in a side by side arrangement or in an up and down arrangement on the outer surface of the shell.
3. The distance measuring device according to claim 1, further comprising:
a tapeline structure disposed within the shell.
4. The distance measuring device according to claim 3, wherein
the laser generating means and the photoelectric conversion means are both located above or below the tapeline structure; and
the power supply is provided on the left or right side of the tapeline structure.
5. The distance measuring device according to claim 3, wherein the power supply, the laser generating means and the photoelectric conversion means are all located in front of or behind the tapeline structure; and the laser generating means and the photoelectric conversion means are both located above or below the power supply, or on the left or right side of the power supply.

6. The distance measuring device according to claim 3, wherein the power supply is located in front of or behind the tapeline structure; and the laser generating means and the photoelectric conversion means are located on the left or right side of the tapeline structure.

7. The distance measuring device according to claim 3, wherein the circuit board is disposed horizontally above the tapeline structure; or vertically disposed on the left or right side of the tapeline structure.

8. The distance measuring device according to claim 3, wherein the tapeline structure comprises:

a tapeline wheel disposed within the shell;

a tape, all or part of which is wound on the tapeline wheel; one end of the tape is fixedly connected to the tapeline wheel and the other end is provided with a tape end portion; and a tape outlet provided at the lower end of the outer side wall of the shell, the tape end portion extending out of the shell through the tape outlet.

9. The distance measuring device according to claim 8, wherein the tapeline structure further includes:

a pressure piece provided in the shell and adjacent to the tape outlet, for pressing the tape so that the length of the tape outside the shell remains unchanged; and a locking key provided on an outer surface of the shell, for controlling the pressure piece to press or loosen the tape.

10. The distance measuring device according to claim 1, further comprising:

a second tapeline structure disposed within the second shell; and the second shell is detachably connected to the shell.

11. The distance measuring device according to claim 10, wherein the shell is L-shaped; the shell comprising:

a horizontal portion located at an upper portion of the shell; and a vertical portion located at a lower portion of the shell; wherein the second shell is detachably connected to the lower left of the shell.

12. The distance measuring device according to claim 11, wherein the shell comprises:

at least one first snap slot recessed on a left side face of the vertical portion of the shell;

the second shell comprises:

at least one first strip protruding from a right side face of the second shell;

when the second shell is connected to the shell, the first strip is engaged with the first snap slot.

13. The distance measuring device according to claim 10, wherein the second tapeline structure comprises:

a second tapeline wheel disposed within the second shell;

a second tape, all or part of which is wound on the second tapeline wheel; one end of the second tape fixedly connected to the second tapeline wheel, and the other end provided with a second tape end portion; and a second tape outlet provided at a lower end of the outer side wall of the second shell, the second tape end portion extending out of the second shell through the second tape outlet.

14. The distance measuring device according to claim 13, wherein the second shell comprises:

a rectangular through hole vertically extending through a top surface of the second shell and positioned above the second tapeline wheel;

the shell comprises:

an arcuate groove recessed on a bottom surface of the shell and located above the rectangular through hole;

when the second shell is connected to the shell, an upper portion of the second tape wound on the second tapeline wheel passes through the rectangular through hole and is disposed within the arcuate groove.

15. The distance measuring device according to claim 13, wherein the second tapeline structure further includes:

a second pressure piece provided in the second shell and adjacent to the second tape outlet, for pressing the second tape so that the length of the second tape outside the second shell remains unchanged; and a second locking key provided on an outer surface of the second shell, for controlling the second pressure piece to press or loosen the second tape.

16. The distance measuring device according to claim 10, wherein the distance measuring device further comprises:

an outer casing of shell, which is a transverse U-shape;

when the second shell is connected to the shell, the outer casing of shell is coated on an outer surface of the shell and the second shell.

17. The distance measuring device according to claim 16, wherein:

the shell comprises at least one second snap slot recessed on a front side face and/or a back side face of the vertical portion of the shell;

the shell outer casing comprises at least one second strip protruding from an inner side face of the shell outer casing, corresponding to the second snap slot; and when the shell outer casing is coated on the outer surface of the shell, the second strip is snap-fitted to the second snap slot.

18. The distance measuring device according to claim 1, wherein the outer surface of the shell further comprises:

a display means connected to the processor, for displaying the distance from the object to be measured to the distance measuring device.

19. The distance measuring device according to claim 1, wherein the outer surface of the shell further comprises:

an operating means connected to the processor, for transmitting at least one control instruction to the laser ranging device.

20. The distance measuring device according to claim 19, wherein the operating means comprises:

an operation panel provided on an upper surface, a front surface or a rear surface of the shell, for inputting at least one control action, each of the control actions corresponding to a control instruction; and an operation circuit board disposed below the operation panel and connected to the processor, for converting the at least one control action into at least one electrical signal and transmitting the electrical signal to the processor; each of the electrical signals corresponding to a control instruction;

wherein the control instructions comprise, but are not limited to, start instructions, close instructions, and store instructions.

\* \* \* \* \*